(12) United States Patent
Mayen et al.

(10) Patent No.: US 7,985,943 B2
(45) Date of Patent: Jul. 26, 2011

(54) WATER HEATER OF ENDORSEMENT WITH IONIZED IGNITION AND ELECTRONIC CONTROL OF TEMPERATURE, FOR SOLAR HEATERS OF THE TYPE THERMOSIPHON

(75) Inventors: Maria Guadalupe Ruiz Mayen, Delegación Alvaro Obregón (MX); Gilberto Sanchez Villalobos, Delegación Iztapalapa D.F. (MX)

(73) Assignee: Calentadores de America, S.A: de C.V., Mexico City, C.P. (MX)

( * ) Notice: Subject to any disclaimer, the term of this patent is extended or adjusted under 35 U.S.C. 154(b) by 668 days.

(21) Appl. No.: 12/128,990

(22) Filed: May 29, 2008

(65) Prior Publication Data
US 2009/0120923 A1    May 14, 2009

(51) Int. Cl.
*F02B 19/00* (2006.01)
(52) U.S. Cl. ........................ 219/270; 219/260
(58) Field of Classification Search ............... 219/270, 219/260, 261, 263, 264, 265, 266, 267, 268, 219/269
See application file for complete search history.

(56) References Cited

U.S. PATENT DOCUMENTS

| | | | |
|---|---|---|---|
| 3,539,872 A * | 11/1970 | Tyler | 361/247 |
| 4,564,003 A | 1/1986 | Iwanicki et al. | |
| 4,681,154 A | 7/1987 | Yano et al. | |
| 4,713,574 A * | 12/1987 | Scott | 313/130 |
| 5,704,775 A * | 1/1998 | Gilbert | 431/66 |
| 5,900,176 A | 5/1999 | Tassicker et al. | |
| 6,191,537 B1 * | 2/2001 | Celso | 315/219 |
| 6,552,657 B2 * | 4/2003 | Long et al. | 340/438 |
| 7,163,619 B2 | 1/2007 | Wang | |
| 7,225,778 B2 * | 6/2007 | Reissner et al. | 123/145 A |
| 7,528,346 B2 * | 5/2009 | Serra et al. | 219/270 |

FOREIGN PATENT DOCUMENTS

| | | |
|---|---|---|
| CA | 2 613 129 | 1/2007 |
| DE | 44 43 715 A1 | 6/1996 |
| WO | WO 98/04874 | 2/1998 |
| WO | WO 2004/038305 A1 | 5/2004 |
| WO | WO 2005/026627 A1 | 3/2005 |
| WO | WO 2005/040695 A1 | 5/2005 |
| WO | WO 2005/061969 A1 | 7/2005 |
| WO | WO 2007/053859 A2 | 5/2007 |
| WO | WO 2007/057864 A1 | 5/2007 |
| WO | WO 2007/101899 A1 | 9/2007 |

* cited by examiner

*Primary Examiner* — Daniel Robinson
(74) *Attorney, Agent, or Firm* — Dority & Manning, P.A.

(57) ABSTRACT

A backup water heater for installation downstream of a water outlet of a thermosiphon solar water heater includes a corrosion resistant tank having a fin heat exchanger. A burner is supplied with gas from a gas feed valve system that includes at least one electrovalve connected to a cast body configured. A bimetallic temperature detector is disposed to detect the temperature of water in the tank, and a flow detector is disposed so as to activated by water flow through the tank. A first spark plug ignites the burner, and a second spark plug positioned to detect current changes in the first spark plug generated by ionization effect after the burner is ignited. An electronic controller is in operative communication with the various components to send a current to the first spark plug upon detection of a low setpoint temperature from the temperature detector and a detected setpoint flow from the flow detector. The electronic controller causes gradual opening of the electrovalve to supply gas to the burner to ignite the burner with the first spark plug. The electronic controller detects the change of current from the second spark plug and generates a visual display of normal operation, or closes the electrovalve and terminates operation of the water heater if the change of current is not detected within a defined time.

8 Claims, 2 Drawing Sheets

WATER HEATER OF ENDORSEMENT WITH IONIZED IGNITION AND ELECTRONIC CONTROL OF TEMPERATURE, FOR SOLAR HEATERS OF THE TYPE THERMOSIPHON

FIELD OF THE INVENTION

The present invention refers generally to solar water heating equipment of the thermosiphon type which is accompanied by a water heater with an ionized system that provides a constant water supply.

BACKGROUND OF THE INVENTION

Backup systems for solar water heaters (mainly with panels larger than 2 m$^2$ of capture area) are used in high hot water demand systems or in processes where a constant hot water supply is necessary. Although there exist auxiliary water heating systems such as those cited in PCT Patent Applications Nos. WO/2007/101899; WO/2007/053859; WO/2007/000112; WO/2005/061969; WO/2005/040695; WO/2005/026627; WO/2004/038305; WO/2002/084037; WO/1998/004874; WO/1996/018072; WO/1995/004905; WO/1982/003271; and WO/1981/002774, the aforementioned references focus mainly on systems related to electricity and lack backup support from another type of energy.

On the other hand, solar water heaters with panels of less then 2 m$^2$ of capture area typically use, as backup systems to avoid lack of hot water, traditional water heaters connected to the top part of the solar panel storage tank, additionally obtaining variable energy savings. This is in contrast to the water heater of the present invention.

SUMMARY OF THE INVENTION

Objects and advantages of the invention are set forth in part in the following description, or may be obvious from the description, or may be learned through practice of the invention.

To satisfy the demand for hot water supply with the greatest possible fuel savings, the present invention integrates an electronic system with a set of gas valves which gradually light the water heater burner, in a direct way by means of an electrical spark and a flame detector, such as that cited in International Patent Application PCT No. IB2006/054321. However, the water heater described in the aforementioned patent application does not fully adapt itself to most hydraulic installations, therefore in many cases it is necessary to adapt or integrate other elements for its operation, increasing the equipment and maintenance cost for the entire system.

The backup water heating system of the present invention has an ignition system of the ionized type such as the one described in Patent No. WO/2007/057864, with the difference that it only works when the electronic card gives the order to ignite only when the bimetallic detector, located 5.08 cm (2 inches) below the top lid of the heater, detects a temperature lower than 38° C. (according to a control temperature range) and the order to turn off when it detects a temperature higher than 50° C., accompanied by a flow detector at low water pressure that activates the equipment when water demand exists. It should be mentioned that the water heater is insulated and that the temperature range is set so that the backup heater provides a constant supply of water at a temperature higher than 38° C., even when a comfortable temperature does not exist in the thermotank. The whole system may operate with 2 alkaline batteries of 1.5 V that last a minimum of 8 months.

Although having a solar water heater instead of a traditional water heater means considerable fuel savings, it does not completely satisfy the hot water demand or the fuel savings desired by consumers since it is not satisfactory at the time of the year when low temperatures prevail, because the temperature and gas controls are combined into a single control, or a high voltage power source is necessary to activate some of these controls. In addition, it may be necessary to have a unique or special feature for the water heater operation.

Due to the requirements in places where neither constant pressure nor flow regulation is available in residential hydraulic facilities, there is a need for a backup heater, such as the one described in the present invention, for solar water heaters, which can use any type of gas as fuel, to achieve fuel savings greater than those already obtainable by using existing water heaters that currently complement solar water heaters, and which can be adapted to the distinct and diverse hydraulic installations already existing or which could be built in the future, to satisfy the demand for a constant supply of water at a comfortable temperature.

DETAILED DESCRIPTION

Figure 1:
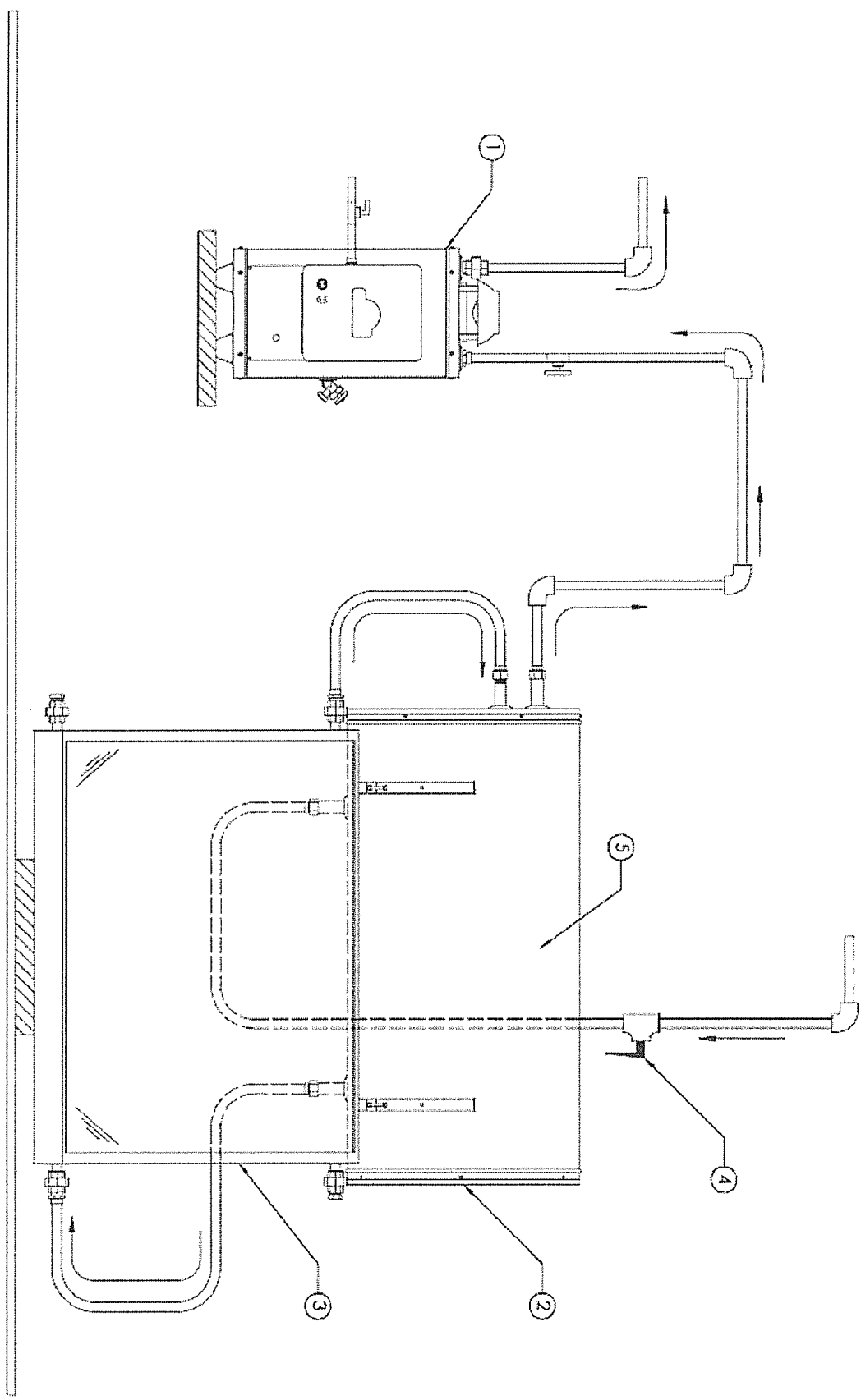
FIG. 1 is a general view wherein the main system components, which include a panel, a storage tank, a backup heater, a relief check valve, and a external body, are shown.
Figure 2:
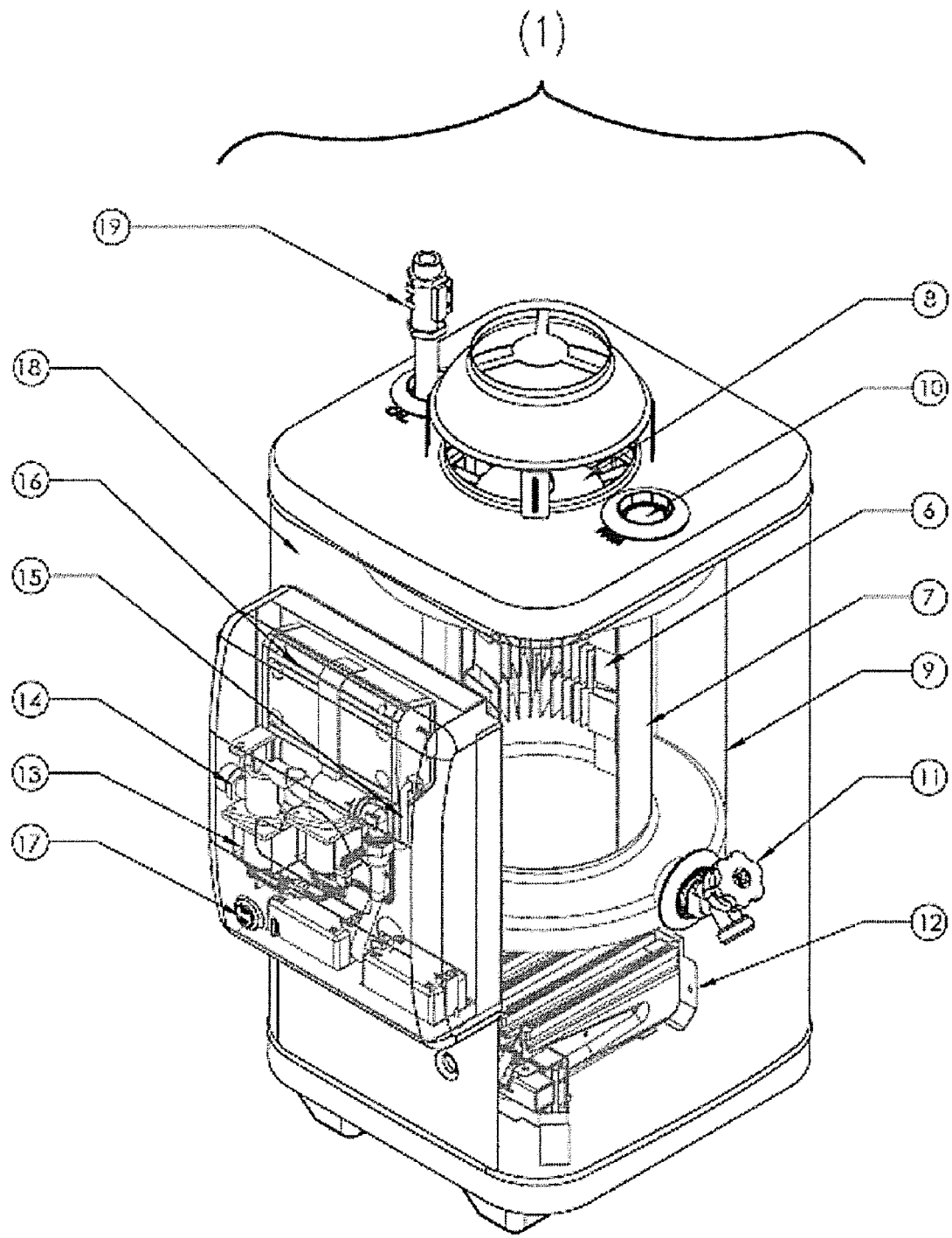
FIG. 2 is an isometric view of the interior of the backup heater, showing the main components which are: burner, drainage valve, tank, diffuser, electronic card, flow detector, electrovalves, bimetallic cable, aluminum body, ON/OFF button, covered piping, feed pipe, heat transfer collectors, fins, and external body.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Referring to the embodiment in the figures, the solar panel (3), in front of the gas water heater (1), must have a panel (3) smaller than 2 m$^2$ and larger than or equal to 1.5 m$^2$ of a flat surface for solar energy capture, which is sufficient to raise the temperature to 50° C. in a storage tank (2) located at the top of the panel (3) to achieve a thermosiphon effect, and having a capacity of between 100 and 150 liters of water. Said storage tank (2) has a relief check valve (4) which prevents the pressure from building up in the storage tank (2) due to the increase in water temperature and in turn prevents the backflow of the heated water into the hydraulic network, as well as an internal tubing system that allows for the extraction of water from the top part of the storage tank (2), and a water choke system at the tank inlet (2) to prevent temperature mixing inside the tank. The storage tank (2) also has a minimum lining thickness of 5.08 cm (2 inches) of polyurethane foam insulation to retard the temperature loss inside the tank (2) when the ambient temperature is below 10° C. and has an external body made of a steel plate (5) protected against corrosion to prevent a rapid deterioration of the lining. In turn all the metallic parts and materials used in the solar panel (3) and storage tank (2) must be corrosion resistant or protected against corrosion by means of a porcelainizing and a cathode protection. Once the solar panel (3) is installed and its compliance verified with the characteristics previously described, the storage tank (2) is connected to the backup gas heater (1).

In a particular embodiment, the backup water heater (1) is designed in such a way that it has a power input between 10 kW and 20 kW, and a set of steel fins (6) welded to a steel heat transfer collector (7) of 15.24 cm (6 inches) in diameter and a height of 35.56 cm (14 inches), covering the largest possible space to retain and transfer from 85% to 90% of the input power using a pipe (8) of 10.16 cm (4 inches) in diameter covered at one of its ends with a steel plate of 11.43 cm (4.5 inches) in diameter and supported by the fins (6) welded to the collector (7). This heater (1) is designed to contain only from 8 $dm^3$ (8 liters) to 15 $dm^3$ (15 liters) of internal volume and to withstand a maximum working pressure of 4.5 kilograms per square centimeter (0.45 MPa), with a testing pressure of 12 kilograms per square centimeter.

The entire tank (9) of the backup heater (1) is made of steel and the areas in contact with water are porcelainized, depending on its capacity and the needs of the user, which dictate the shape of the tank (9) of the water heater (1). The water feed is located in the top lid of the tank (9) and the water is deposited in the lower part of the tank (9) by means of a feed pipe (10), with the water outlet also located in the top part of tank (9). Additionally, in the lower part of the tank (9) there is a 3/4 ISO coupling which connects the exterior with the water contained in the tank (9) to place a stopcock or drainage valve (11) allowing for drainage and cleaning of the tank.

Power must be supplied to the water heater by means of a burner of 6 multi-burners (12) and with a variable nozzle diameter to supply from 10 kW to 20 kW with different gases.

The fuel gas is supplied by means of a system of electrovalves (13), connected to a body (14) of cast aluminum or ZAMAC alloy. This set of electrovalves (13) connected to the cast body (14) comprises the gas feed valve system. The valve system, the bimetallic cable (15) and the electronic card (16) are located inside a metallic or plastic cover that protects them from the atmosphere.

The system of gas feed valves is connected to the burner (12) by means of an aluminum or copper pipe of 9.525 mm (0.375 inches) in diameter and brass or bronze connections of 15.875 mm (0.625 inches) in diameter and must normally be closed until the electronic card (16) gives the signal to open. The gas feed connection to the system of gas feed valves is 1.27 cm (0.5 inches) in diameter and it must be calibrated between 1.7 kPa and 3.2 kPa depending on the type of gas to be used.

The bimetallic cable (15) is connected to a brass, bronze, tropicalized steel or other corrosion resistant material connector in such a way that it is joined to a coupling located in the tank or inserted into a bulb and prevents water leakage by means of a neoprene seal. The bimetallic cable (15) detects the temperature and sends a signal to the electronic card (16) at the opposite end of the plastic cover and located 5.08 cm (2 inches) below the tank top lid, to prevent overheating in the hydraulic network.

The electronic card (16), upon translating the signal of a temperature below 38° C. sent from the bimetallic cable (15) and a water demand signal sent by the flow detector (19) and taken directly in the water passing through the tank (9), sends a direct current electrical spark through a ceramic spark plug connected to the electronic card (16) by means of a cable covered with silicone and to an extension of the reinforced cable, the spark plug being attached at a distance no greater than 4 mm onto one of the 6 multi-burners (12), which comprise the burner (12) of the water heater (1). After 1.5 seconds and with the electrical spark in operation, the electronic card (16) sends a signal to the gas feed valve system for the gradual and successive opening of the electrovalves (13) to permit a gradual gas flow to the burner (12) avoiding any excessive gas accumulation in the combustion chamber and preventing possible accidents.

Once the burner (12) is lit, another spark plug attached at a distance no greater than 20 mm onto one of the 6 multi burners (12) will detect the flame by means of an ionization process in which the spark generated by the other spark plug changes from direct current to alternating current. This change of current is sent to the electronic card (16) by means of a reinforced cable and is followed by a silicone covered cable. If the change-of-current signal is not detected by the card (16) within 5 seconds or the signal appears intermittently in the same period of time, or if the burner goes out or the change-of-current signal appears intermittently during the operation of the heater (1), the electronic card (16) sends a signal to the gas feed valve for the immediate closing of the electrovalves (13) and blocks the operation of the heater (1) for 2 minutes to make an electronic review of the components connected to the card (16). Once the aforementioned 2 minutes have elapsed, an attempt is made to ignite the heater (1) until a clear signal is obtained of the current change in the burner (12). If no change-of-current signal is detected after three attempts, the card (16) will show an error by means of a visual signal indicated by a red light, which will indicate that the intervention of technical service is necessary for the backup water heater (1).

Once the change-of-current signal is detected by the electronic card (16), the water inside the tank (9) will be heated up until the bimetallic cable (15) sends a signal to the electronic card (16) indicating that the temperature has reached 50° C. for the water contained inside the tank (9). When the card (6) receives the signal sent by the bimetallic cable (15), which indicates that 50° C. has been reached, the electronic card (16) in turn sends a signal to close the electrovalves (13) of the gas feed valve system. The ignition cycle will not be reactivated until the bimetallic cable (15) sends a signal indicating that the water temperature in the tank (9) is lower than 38° C. and the flow detector (19) sends a signal of water demand. The electronic card (16) is electrically fed from a power source which comprises a set of 2 alkaline batteries of 1.5 v.

In turn, the electronic card (16) will distribute the electricity feed to the different components to which it is connected, administering it in the most efficient way to obtain a useful life of approximately 8 months for the batteries according to the use of the backup water heater (1). Between the power source and the electronic card (16), there is an ON/OFF switch (17) to directly control the feed to the card (16), which has two visual indicators, a blue one indicating that the heater is in operation and a red one indicating that the heater is in error mode or is making a failure analysis.

The tank (9) is supported upon a combustion chamber of 20.32 cm (8 inches) in height and a diameter less than the outside diameter of the tank (9), but strong enough to withstand the weight of the heater (1) when full of water. Inside the combustion chamber are located the burner (12), and the spark plugs attached to it and connected to the electronic card (16) The combustion chamber is attached to a square base which has a series of openings 50 mm in diameter to provide the air flow necessary for the combustion to take place, and said openings are 40 mm high to allow for the airflow to circulate toward the burner (12). The combustion chamber is insulated with ceramic fiber from 5.08 to 7.62 cm (2 to 3 inches) in thickness and only the burner gate is left free of the lining to provide access to the chamber when it is necessary to conduct maintenance. The rest of the tank (9) is insulated with thermal fiberglass from 5.08 to 7.62 cm (2 to 3 inches) in thickness.

The insulated tank (9) and combustion chamber are placed inside of an external body comprising a plate (18), which is coated with a corrosion resistant electrostatic paint. This external body (18) is attached to the base of the combustion chamber and covered with a flat lid containing openings wherein the tubes for feeding water to the tank (9) are located. The lid and the external base are protected by a corrosion resistant electrostatic paint, as is the external body (18). The external body (18) has three openings of different sizes, the largest one is located near the burner (12), to allow an exit for the spark plug cables, as well as for the tube that connects the system of gas feed valves to the burner (12) and allows the unobstructed maintenance of the burner (12). This opening, later covered with a lid on which ceramic fiber insulation of a thickness from 5.08 to 7.62 cm (2 to 3 inches) is deposited, allows the spark plug cables and the gas feed tube to pass through. This lid is attached with screws in order to have easy access to the burner (12) when performing maintenance on the water heater (1). The lid is coated with corrosion and temperature resistant electrostatic paint.

The smallest opening located in the anterior part of the external body (18) allows the bimetallic cable (15) and the connection to pass through. The system of gas feed valves and the electronic card (16), together with the battery carrying box, are also attached to the anterior part of the external body (18). This set is covered with a laminate lid (or a plastic lid), which itself is coated with a corrosion resistant electrostatic paint but leaves visible the card (16) indicators as well as the equipment ignition button (17). The last opening is located on one side of the external body (18) at the level of the drainage coupling where a drainage stopcock (11) is placed for tank (9) maintenance.

The backup water heater (1) thus described is connected to the thermotank (2) outlet by means of corrosion resistant metallic tubes, preferably of copper of 1.90 cm (0.75 inches). The backup heater (1) will not be ignited until a temperature of 50° C. is reached in the tank (9) and a temperature of between 30° C. and 40° C. in a tubing section up to 5 meters long and part of the thermotank (2) if it is within the aforementioned distance. This heating in the tubes prevents temperature losses and delays in water circulation in the tubes, making the system more efficient.

In the insulation system, the position of the temperature detector by bimetallic cable (15) is 5.08 cm (2 inches) below the top lid of the tank (9) of the backup water heater (1) to detect the temperature change. Heating the water in the tubes prevents the lowering of the temperature of the thermotank (2) due to an inverse thermosiphon effect with the backup water heater (1) thus maintaining for a longer period of time the temperature of the water heated by the solar panel (3) and captured in thermotank (2), increasing fuel savings in the system, which is improved because there is no appreciable expense associated with a gas pilot light. Similarly, the backup water heater (1) heats the water contained in its tubes to a temperature of from 30° C. to 40° C.

As an additional advantage, by slightly heating the water contained in the thermotank (2) of the flat solar panel (3) with fins, the panel (3) efficiency increases when the solar thermal energy is transferred to the water.

When a small demand is made, the solar panel (3) will feed the previously heated water to the backup heater (1), which will not be turned on because the temperature detector is located in the highest temperature zone of the tank (9) of backup heater (1), unless the water temperature is lower than 38° C., which would mean that thermotank (2) contains water at said temperature.

When large water demands are made, the water previously heated by the solar panel (3) will feed the backup heater (1), which will be activated as soon as the backup heater (1) temperature is below 38° C., which would mean that the thermotank (2) contains water at said temperature.

The operation of the water heater of the present invention is limited by the internal temperature of the heater tank (9), which is fed directly from the thermotank (2) of the solar panel (3) and does not use a permanently lit pilot light.

It should be readily appreciated by those skilled in the art that various modifications and variations can be made to the embodiments of the method and systems described herein. It is intended that the present invention encompass such modifications and variations as come within the scope of the appended claims and their equivalents.

The invention claimed is:

1. A backup water heater for installation downstream of a water outlet of a thermosiphon solar water heater, comprising:
   a corrosion resistant tank;
   a burner, and a gas feed valve system including at least one electrovalve connected to a cast body configured to deliver a gas to said burner;
   a bimetallic temperature detector disposed to detect water temperature within said tank;
   a flow detector activated by water flow through said tank;
   a first spark plug positioned to ignite said burner, and a second spark plug positioned to detect current changes generated by ionization effect caused by the flame after said burner is ignited;
   an electronic controller in operative communication with said electrovalve, said temperature detector, said flow detector, and said first and second spark plugs to send a current to said first spark plug upon detection of a low setpoint temperature from said temperature detector and a detected setpoint flow from said flow detector, said electronic controller causing gradual opening of said electrovalve to supply gas to said burner to ignite said burner with said first spark plug;
   said electronic controller configured to detect the change of current from said second spark plug and to generate a visual display of normal operation, or to close said electrovalve and terminate operation of said water heater if the change of current is not detected within a defined time and to generate a visual display of equipment error.

2. The backup water heater as in claim 1, wherein said electronic controller controls operation of said burner within a temperature range of from 38 degrees Celsius to a cut-off temperature of 48 degrees Celsius as detected by said temperature detector.

3. The backup water heater as in claim 1, wherein said burner comprises a plurality of individual burners and delivers between 10 kW and 20 kW of heating power to said tank.

4. The backup water heater as in claim 1, further comprising connecting tubes between the solar water heater and said tank, said temperature detector located adjacent a top of said tank where said tubes deliver water from said solar heater to said tank, whereby water in said tubes is heated within a range of 30 degrees Celsius to 40 degrees Celsius by the water maintained in said tank.

5. The backup water heater as in claim 1, wherein said electronic controller activates said electrovalve to supply gas to said burner no sooner than 1.5 seconds after causing said first spark plug to spark.

6. The backup water heater as in claim 5, wherein said electronic controller closes said electrovalve and terminates operation of said water heater if the change of current is not detected within 5.0 seconds of opening said electrovalve, said electronic card configured to wait a defined time until making at least one additional attempt to start said water heater, and displaying the visual indication of equipment error upon failure of the additional attempt.

7. The backup water heater as in clam 1, wherein power to said electronic controller is supplied by replaceable batteries.

8. The backup water heater as in claim 1, wherein said tank is fed water directly from a thermotank of the solar water heater.

* * * * *